United States Patent
Cheng et al.

(10) Patent No.: US 11,355,036 B2
(45) Date of Patent: Jun. 7, 2022

(54) ASSEMBLED SUPPORT MECHANISM FOR LED DISPLAY SCREEN AND SPLICING METHOD THEREOF

(71) Applicant: SHENZHEN CREATELED ELECTRONICS CO., LTD., Shenzhen (CN)

(72) Inventors: Zhuo Cheng, Shenzhen (CN); Zhichun Tian, Shenzhen (CN); Jiangbo Tu, Shenzhen (CN); Lijian Luo, Shenzhen (CN)

(73) Assignee: SHENZHEN CREATELED ELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 16/499,055

(22) PCT Filed: Aug. 2, 2019

(86) PCT No.: PCT/CN2019/099043
§ 371 (c)(1),
(2) Date: Sep. 27, 2019

(87) PCT Pub. No.: WO2020/134088
PCT Pub. Date: Jul. 2, 2020

(65) Prior Publication Data
US 2021/0312839 A1    Oct. 7, 2021

(30) Foreign Application Priority Data
Dec. 28, 2018 (CN) .......................... 201811625718.4

(51) Int. Cl.
*G09F 9/33* (2006.01)
*F16M 11/20* (2006.01)
(Continued)

(52) U.S. Cl.
CPC ........... *G09F 9/33* (2013.01); *F16M 11/2007* (2013.01); *G09F 9/3026* (2013.01); *E04B 1/344* (2013.01);
(Continued)

(58) Field of Classification Search
CPC .... F16M 11/00; F16M 11/2007; F16M 13/00; F16M 2200/00; F16M 2200/06;
(Continued)

(56) References Cited

U.S. PATENT DOCUMENTS 5,768,096 A    6/1998  Williams et al.
D530,595 S  * 10/2006  Lam .............................. D8/373
(Continued)

FOREIGN PATENT DOCUMENTS

CN    103000088 A    3/2013
CN    203721138 U    7/2014
(Continued)

OTHER PUBLICATIONS

English Translation to International Search Report for Application No. PCT/CN2019/099043.
(Continued)

*Primary Examiner* — Tan Le
(74) *Attorney, Agent, or Firm* — Cantor Colburn LLP

(57) ABSTRACT

A assembled support mechanism for an LED display screen, comprises: a bottom support, being in an assembled frame structure, provided with devices configured for longitudinal and transverse splicing at a periphery thereof, and the devices configured for longitudinal and transverse splicing comprising a longitudinal engagement device and a transverse engagement device; and middle portions of a front side and a rear side of the bottom support being respectively provided with screen connecting portions configured for connecting to an LED display screen in a vertical direction. A plurality of rotational stands, in detachable connection with the bottom support, and a respective rotational stand after being spliced and assembled being rotatable around the bottom support with a rotational angle range of 0° to 180°.

10 Claims, 12 Drawing Sheets

(51) Int. Cl.
*G09F 9/302* (2006.01)
*F16M 11/04* (2006.01)
*G09F 15/00* (2006.01)
*F16M 13/00* (2006.01)
*E04B 1/344* (2006.01)

(52) U.S. Cl.
CPC ............ *F16M 11/04* (2013.01); *F16M 13/00* (2013.01); *F16M 2200/00* (2013.01)

(58) Field of Classification Search
CPC ......... F16M 2200/08; G09F 9/00; G09F 9/33; G09F 9/3026
See application file for complete search history.

(56) References Cited

U.S. PATENT DOCUMENTS

| | | | | |
|---|---|---|---|---|
| D565,054 S | * | 3/2008 | Anderson | D14/452 |
| 7,823,847 B2 | * | 11/2010 | Bremmon | F16M 13/02 |
| | | | | 248/201 |
| 7,891,620 B2 | * | 2/2011 | Grabania | F16M 11/38 |
| | | | | 248/285.1 |
| 8,074,950 B2 | * | 12/2011 | Clary | F16M 11/048 |
| | | | | 248/280.11 |
| 2006/0219856 A1 | * | 10/2006 | Oh | F16M 13/02 |
| | | | | 248/274.1 |
| 2018/0211575 A1 | * | 7/2018 | Opsomer | G09F 17/00 |

FOREIGN PATENT DOCUMENTS

| | | |
|---|---|---|
| CN | 204463730 U | 7/2015 |
| CN | 205810282 U | 12/2016 |
| CN | 207526829 U | 6/2018 |
| CN | 109545091 A | 3/2019 |
| CN | 209487059 U | 10/2019 |
| DE | 202010014817 U1 | 3/2011 |
| EP | 3352158 A1 | 7/2018 |
| JP | 2003015532 | 1/2003 |
| JP | 2016206543 A | 12/2016 |

OTHER PUBLICATIONS

European Search Report for Application No. 19 77 3725.
International Search Report for Application No. PCT/CN2019/099043.
Written Opinion for Application No. PCT/CN2019/099043.

* cited by examiner

ASSEMBLED SUPPORT MECHANISM FOR LED DISPLAY SCREEN AND SPLICING METHOD THEREOF

CROSS-REFERENCE TO RELATED APPLICATIONS

This application is a U.S. National Stage of International Patent Application No. PCT/CN2019/099043 filed on Aug. 2, 2019, which claims priority to Chinese Patent Application No. 201811625718.4 filed on Dec. 28, 2018. The aforementioned applications are hereby incorporated by reference in their entireties.

TECHNICAL FIELD

The present application relates to the field of an auxiliary operation and maintenance tool, and more particularly to an assembled support mechanism for an LED display screen and a splicing method thereof.

BACKGROUND

At present, with the rapid development of the LED display screen, the display screen is moving toward a thinner, more compact, and more user-oriented direction, and also imposes higher requirements for the rapid installation of the LED display screen. However, the existing LED display screen needs to be installed by an external steel structure, and the flatness thereof is ensured by the strength of the display screen itself, which makes the transportation and packaging of the steel structure cumbersome and complicated, and the display screen itself is overweight. Thus, it is desired to develop an installation device and method featuring improved lightweight and higher connection strength.

Technical Problems

In order to overcome the defects of the prior art, it is an object of the present application to provide an assembled support mechanism for an LED display screen and a splicing method thereof.

Technical Solutions

In order to achieve the above object, the following technical solutions are adopted:

An assembled support mechanism for an LED display screen, comprises:

a bottom support, being in an assembled frame structure, provided with devices configured for longitudinal and transverse splicing at a periphery thereof, and the devices configured for longitudinal and transverse splicing comprising a longitudinal engagement device and a transverse engagement device; and middle portions of a front side and a rear side of the bottom support being respectively provided with screen connecting portions configured for connecting to an LED display screen in a vertical direction; and a plurality of rotational stands, in detachable connection with the bottom support, and each rotational stand after assembly being rotatable around the bottom support with a rotational angle range of 0° to 180°.

As an embodiment of the present application, the bottom support comprises:

a pair of brackets, spacedly arranged in a longitudinal direction and comprising a front bracket and a rear bracket, with the front bracket and the rear bracket being in equivalent structures in mirror symmetry;

a pair of connecting rods, spacedly arranged in a transverse direction, and configured to connect the front bracket with the rear bracket; and a spacer bracket, with two ends thereof respectively connected to the pair of the connecting rods and separating the bottom support into a front part and a rear part.

The longitudinal engagement device comprises locking pieces and locking columns; the locking pieces are arranged in a pair at an inner side of a front end face of the front bracket, and each of the locking pieces defines a connecting through hole in a middle portion thereof; the locking columns are arranged in a pair at an inner side of a rear end face of the rear bracket and pass through the rear end face of the rear bracket.

The transverse engagement device comprises left arc-shaped locks and right arc-shaped locks; each of the left arc-shaped locks is arranged at an upper surface of the left end part of any one of the pair of brackets, and each of the right arc-shaped locks is arranged at an upper surface of the right end part of any one of the pair of brackets, and the left arc-shaped lock and the right arc-shaped lock are configured to fit each other to form an interlock structure.

As an embodiment of the present application, the screen connecting portions are screen connecting locks arranged in a pair at a front side and a rear side of the bottom support; each screen connecting lock comprises two rotational lock bodies spacedly arranged and a lock accommodation groove configured to accommodate the rotational lock bodies; the rotational lock body is a screw bolt passing through the bottom support; an upper part of each rotational lock body is provided with a rotary valve configured to rotate in a clockwise direction or a counterclockwise direction for fastening or loosening; a lower part of the rotational lock body is in connection with an external LED display screen in a manner of threaded connection.

As an embodiment of the present application:

the rotational stand comprises:

a connecting axle;

a pair of connecting sleeves, comprising: a front connection sleeve sleeving outside one end of the connecting axle, and a rear connection sleeve sleeving outside the other end of the connecting axle, in which the front connection sleeve and the rear connection sleeve are provided with mutually matching inner and outer threads, respectively; and one or more rotational crossbeams, with one end of each rotational crossbeam sleeving outside an outer periphery of the connecting axle and the other end of the rotational crossbeam provided with a semi-movable buckle.

As an embodiment of the present application, the rear connection sleeve is in a stepped sleeve structure, and an outer periphery of a stepped end is provided with outer threads and configured as an outer threaded part. An inner periphery of the front connection sleeve is provided with inner threads configured to fit the outer threads; and an outer periphery of the front connection sleeve is provided with a serrated structure configured for increasing a friction force.

As an embodiment of the present application, the buckle is a semi-opening locking ring, comprising a pair of semi-circular pieces in hinge joint. The two semi-circular pieces are connected via a hinge joint, one semi-circular piece is in fixed connection with the rotational crossbeam, and the other semi-circular piece is a semi-movable structure, with a movable end provided with a linking screw.

As an embodiment of the present application, the left arc-shaped lock and the right arc-shaped lock fit each other to form a rotary pressing type clasp structure. The left arc-shaped lock comprises:

a press handle, with one end fixedly connected at a left end of each of the brackets and the other end being a free end, and configured to rotate after being exerted with an external press and to keep in parallel to the each of the brackets in the absence of the external press; and a U-shaped latch, an opening end being in fixed connection with a fixed end of the press handle.

The right arc-shaped lock comprises a connection boss, an end face of a left side of the connection boss defining a neck configured for fitting the U-shaped latch. The connection boss and the each of the brackets form a movable connection structure. The connection boss is configured to be rotated for a certain angle ranging from −10 degrees and +10 degrees as needed.

As an embodiment of the present application, the connecting rods are made from carbon fibers.

A method for splicing assembled support mechanisms for an LED display screen, the method being applicable to the above-described assembled support mechanism for an LED display screen, the method comprising the following steps:

S1: assembling the support mechanisms individually as support units;

S2: selecting a plurality of the support units as needed and splicing the plurality of the support units in a longitudinal direction;

placing the bottom supports of the support units at adjacent positions in the longitudinal direction within the same horizontal plane, and connecting the bottom supports via locking pieces and locking columns at adjacent ends in the longitudinal direction; and S3: selecting a plurality of the support units as needed and splicing the plurality of the support units in a transverse direction;

placing the bottom supports of the support units at adjacent positions in the transverse direction within the same horizontal plane, and connecting the bottom supports via left arc-shaped locks and right arc-shaped locks at adjacent ends in the transverse direction.

As an embodiment of the present application, step S1 specifically comprises the following steps:

S11: installing a front rotational stand;

collecting any one of the rotational stands, sleeving a buckle of a rotational crossbeam thereof at a front portion of an outer periphery of any one of the connecting rods of the bottom support, fixing the buckle of the rotational crossbeam at the outer periphery of the corresponding connecting rod via the linking screw and limiting degrees of freedom of the rotational crossbeam in three directions, thereby enabling the rotational crossbeam to move in the longitudinal direction with a limited distance and to be rotatable around the connecting rod in connection therewith;

S12: installing a rear rotational stand;

collecting another rotational stand, sleeving a buckle of a rotational crossbeam thereof at a rear portion of an outer periphery of another connecting rod of the bottom support, fixing the buckle of the rotational crossbeam at the outer periphery of the corresponding connecting rod via the linking screw and limiting degrees of freedom of the rotational crossbeam in three directions, thereby enabling the rotational crossbeam to move in the longitudinal direction with a limited distance and to be rotatable around the connecting rod in connection therewith;

S13: splicing the rotational stands;

rotating the connecting axles of the front rotational stand and the rear rotational stand after being assembled with the bottom support to the same height level, connecting the front connection sleeve and the rear connection sleeve at two adjacent ends of the connecting axles by threaded connection to form an assembled triangle structure in an unfolded state; and S14: folding the rotational stands;

rotating connection sleeves at the adjacent ends of the connecting axles of the assembled rotational stands for disassembling, rotating the front rotational stand and the rear rotational stand after being disassembled respectively to the left direction and the right direction until the front rotational stand and the rear rotational stand are folded onto the bottom support.

BENEFICIAL EFFECTS

The assembled support mechanism for the LED display screen and the splicing method thereof provided by the present application are capable of realizing fast splicing by a single person. The support mechanism can be folded or unfolded in required working environment, and the unfolded structure enhances the intensity and thickness of the LED display screen, which allows the LED display screen to stand on the ground, and the support mechanism may be climbed in order to maintain the display screen. When the two rotational stands are unfolded and form a stable triangle with the bottom support, the thickness of the support mechanism for the LED display screen increases, which in turn increases the wind resistance torque and enhances the wind resistance in outdoor use. Based on the unitized splicing operation, the bottom supports can be accumulatively spliced in both the longitudinal direction and the transverse direction, thus having high degree of freedom and flexibility, being suitable to the LED display screens of different specifications and sizes. Based on the technical feature that the LED display screen may be quickly connected with the support mechanism as a whole structure via the screen connecting locks, the conventional steel structure arranged at the back of the LED display screen may be replaced. Moreover, the support mechanism is made of a material comprising high carbon fibers and an aluminum alloy, which greatly reduces the weight of the LED display screen in the installation and operation and the operation complexity thereof. The support mechanism has complete function, simplified and reliable structure, convenient disassembling, and easy transportation.

Figure 1:
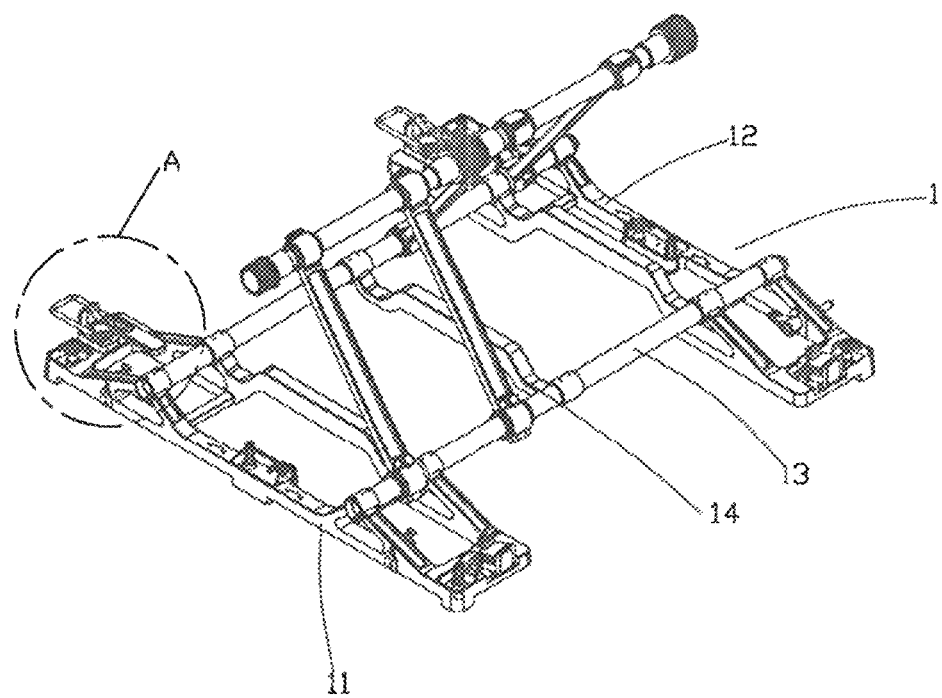
FIG. 1 is a schematic structural view of a support mechanism for a display screen according to an embodiment of the present application in an unfolded state.
Figure 2:
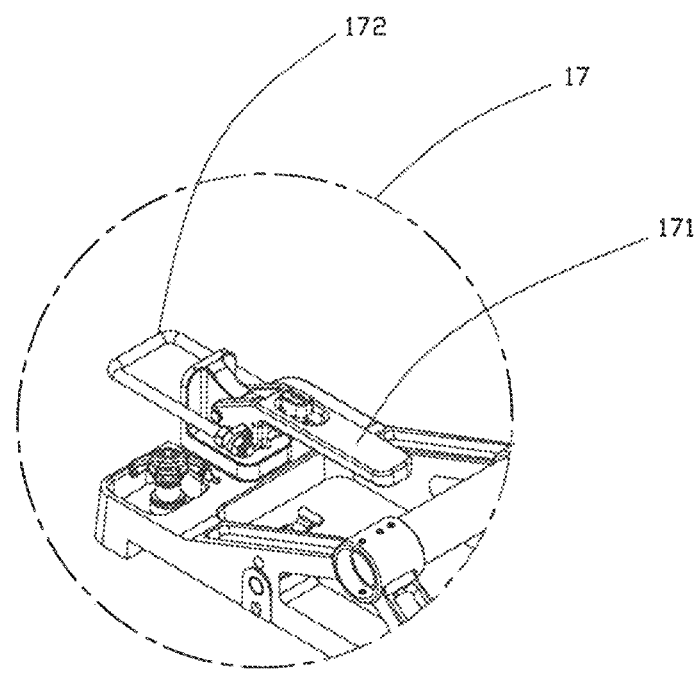
FIG. 2 is an enlarged view of Part A in FIG. 1 showing a partial structure of a left arc-shaped lock.
Figure 3:
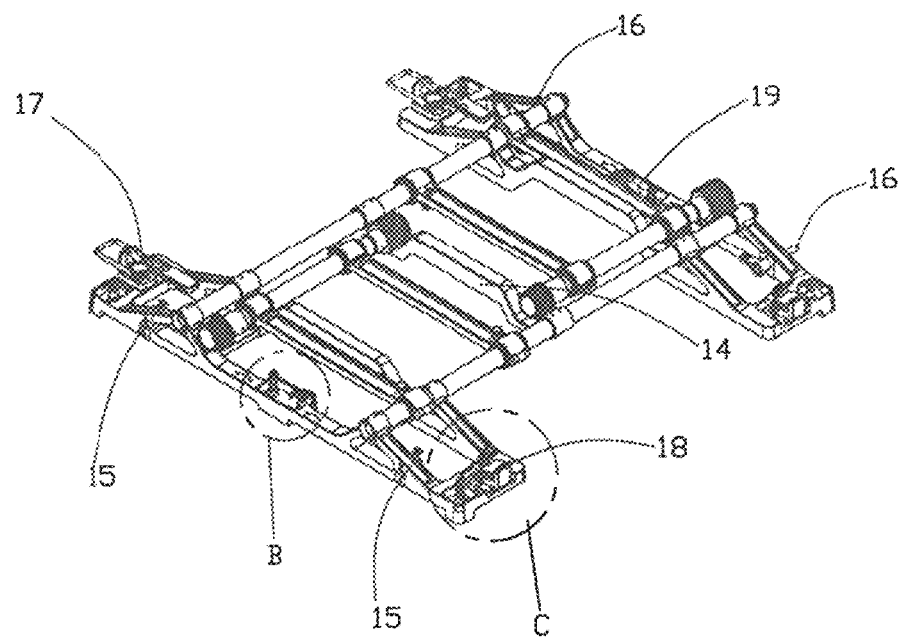
FIG. 3 is a schematic structural view of the support mechanism for a display screen of the present application in a folded state.
Figure 4:
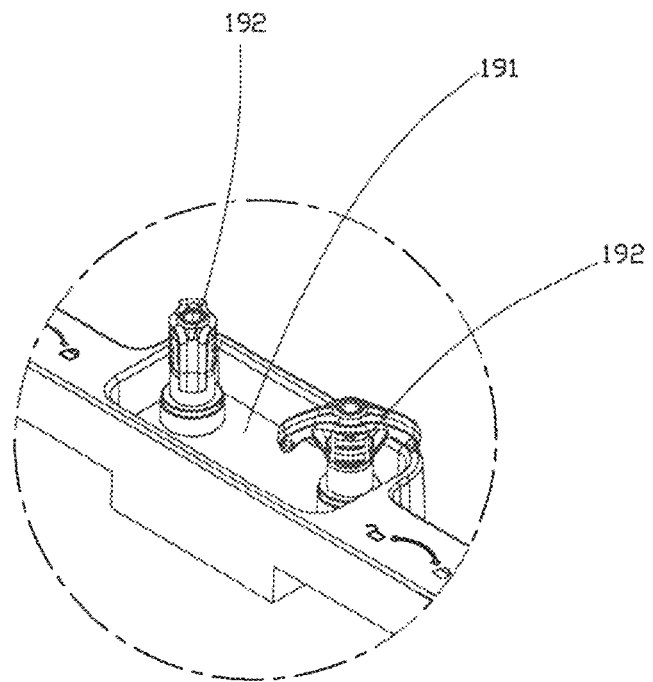
FIG. 4 is an enlarged view of Part B in FIG. 3 showing a partial structure of a screen connecting lock.
Figure 5:
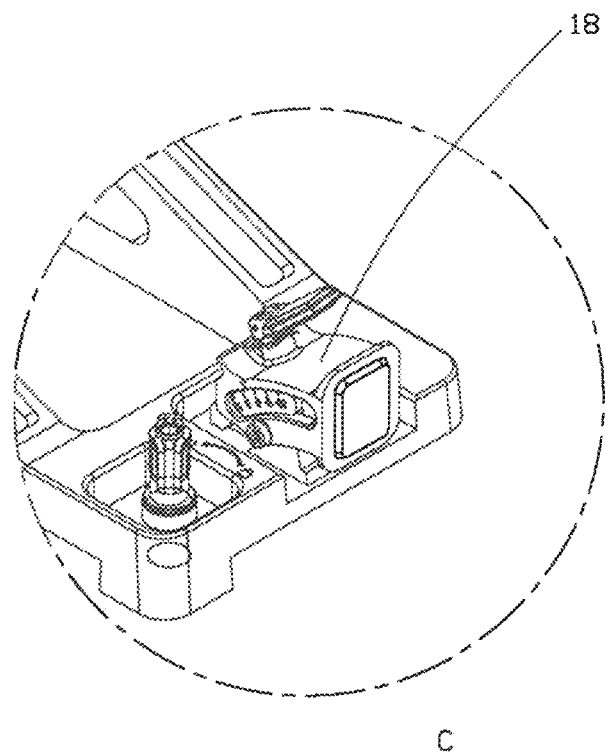
FIG. 5 is an enlarged view of Part C in FIG. 3 showing a partial structure of a right arc-shaped lock.
Figure 6:
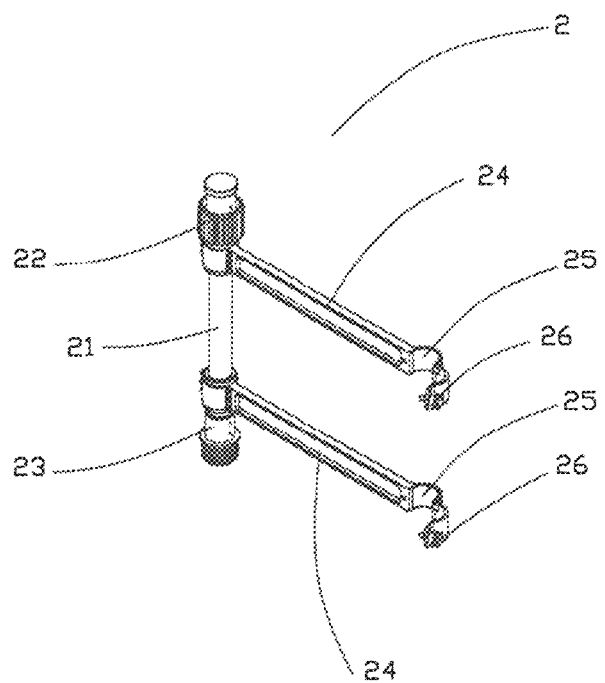
FIG. 6 is a schematic structural view of a rotational stand of the present application.
Figure 7:
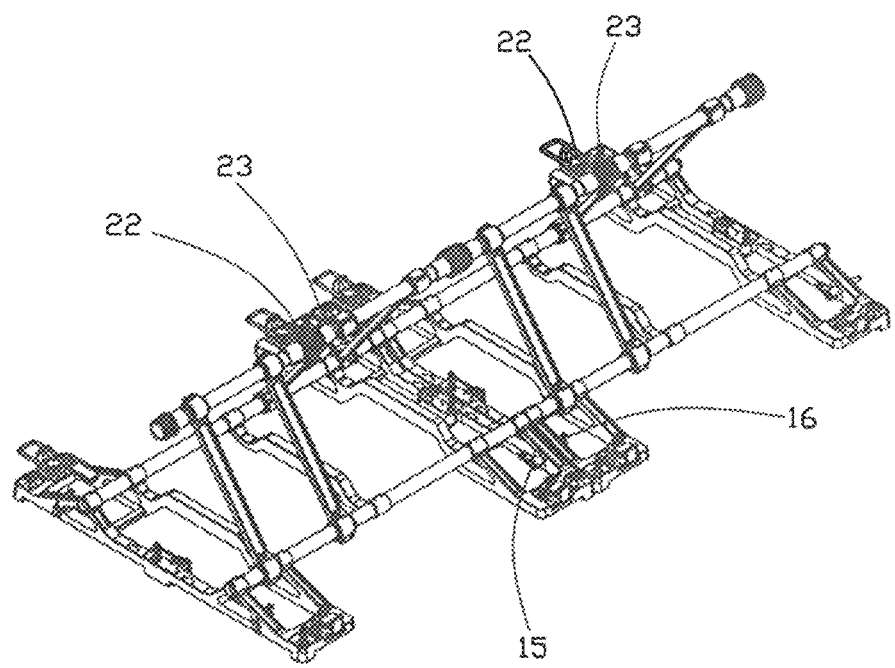
FIG. 7 is a schematic structural view of support units in a spliced state in a longitudinal direction.
Figure 8:
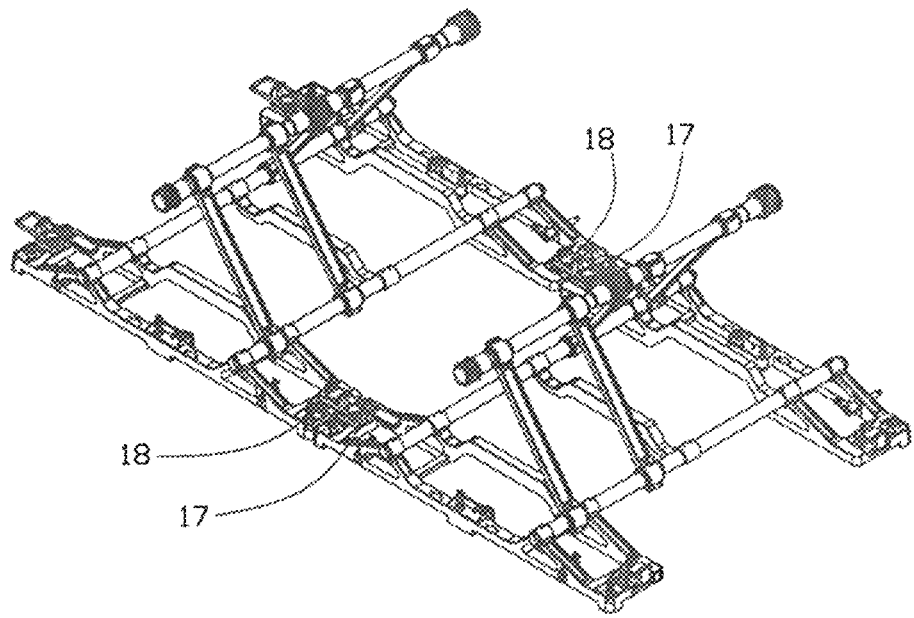
FIG. 8 is a schematic structural view of support units in a spliced state in a transverse direction.
Figure 9:
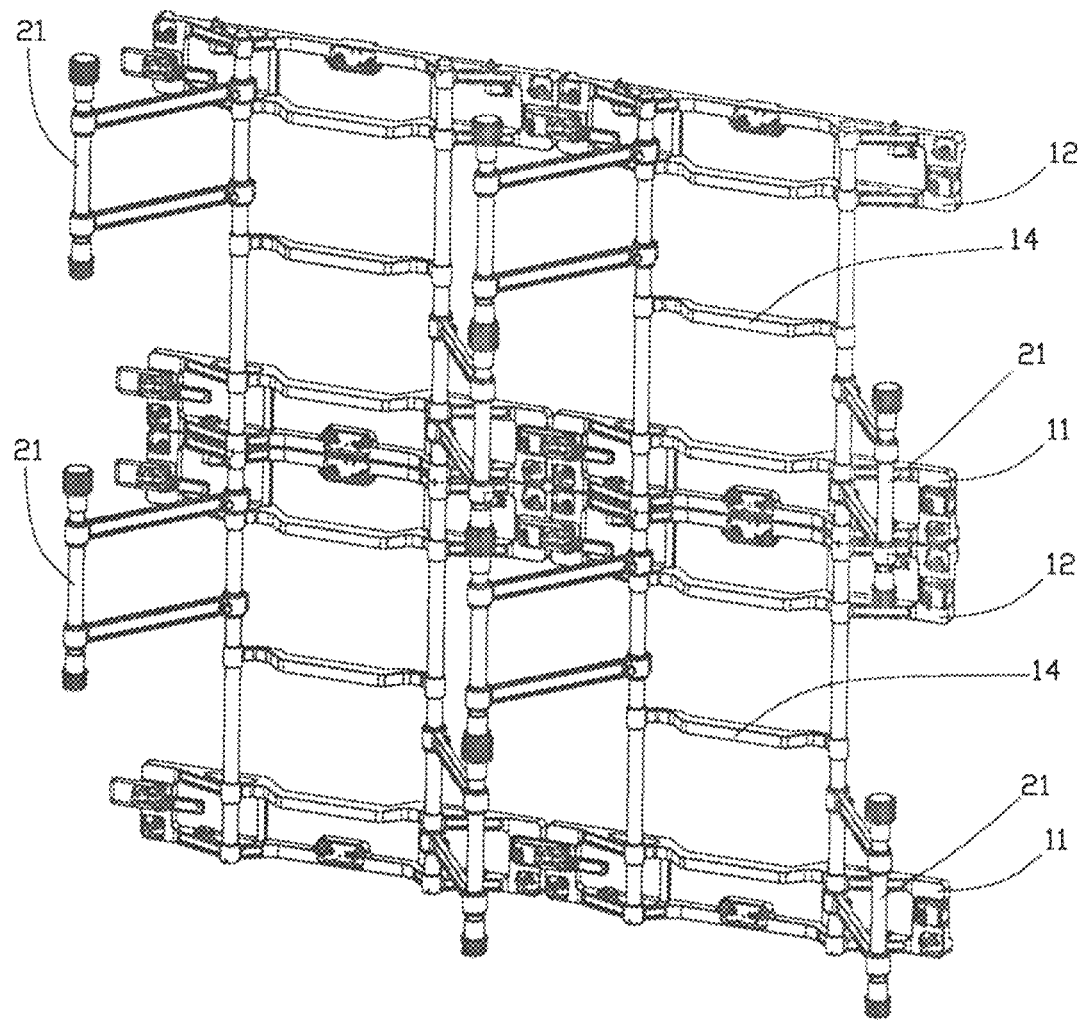
FIG. 9 is a schematic structural view of support mechanisms for a display screen of the present application after being spliced and in a vertical placement working state.

Reference numerals are as follows:
1: Bottom support; 11: Front bracket;
12: Rear bracket; 13: Connecting rod;
14: Spacer bracket; 15: Locking piece;
16: Locking column; 17: Left arc-shaped lock;
18: Right arc-shaped lock; 19: Screen connecting lock;
2: Rotational stand; 21: Connecting axle;
22: Front connection sleeve; 23: Rear connection sleeve;
24: Rotational crossbeam; 25: Buckle;
26: Linking screw; 171: Press handle;
172: U-shaped latch; 191: Lock accommodation groove;
192: Rotational lock body; and 3: LED display screen.

DETAILED DESCRIPTION OF THE EMBODIMENTS

For the purpose of better understanding the above purposes, technical features, and advantages of the present application, the present application will be further described in detail below with reference to the drawings and specific embodiments.

In the following detailed description, numerous specific details are set forth in the detailed description of the present application, but the present application may also be implemented in modes different from the embodiments described hereinbelow. Therefore, the protection scope of the present application is not limited to the specific embodiments.

As shown in FIGS. 1-9 and 22, in specific embodiment 1:

An assembled support mechanism for an LED display screen, comprises:

a bottom support 1, being in an assembled frame structure, provided with devices configured for longitudinal and transverse splicing at a periphery thereof, and the devices configured for longitudinal and transverse splicing comprising a longitudinal engagement device and a transverse engagement device; and middle portions of a front side and a rear side of the bottom support 1 being respectively provided with screen connecting portions configured for connecting to an LED display screen 3 in a vertical direction.

a plurality of rotational stands 2, in detachable connection with the bottom support 1, and each rotational stand 2 after assembly being rotatable around the bottom support 1 with a rotational angle range of 0° to 180°.

The bottom support 1 comprises:

a pair of brackets, spacedly arranged in a longitudinal direction and comprising a front bracket 11 and a rear bracket 12, with the front bracket 11 and the rear bracket 12 being in equivalent structures in mirror symmetry;

a pair of connecting rods 13, spacedly arranged in a transverse direction, and configured to connect the front bracket 11 with the rear bracket 12; and a spacer bracket 14, with two ends thereof respectively connected to the pair of the connecting rods 13 and separating the bottom support 1 into a front part and a rear part.

The longitudinal engagement device comprises locking pieces 15 and locking columns 16. The locking pieces 15 are arranged in a pair at an inner side of a front end face of the front bracket 11, and each of the locking pieces 15 defines a connecting through hole in a middle portion thereof. The locking columns 16 are arranged in a pair at an inner side of a rear end face of the rear bracket 12 and pass through the rear end face of the rear bracket 12.

The transverse engagement device comprises left arc-shaped locks 17 and right arc-shaped locks 18. Each of the left arc-shaped locks 17 is arranged at an upper surface of the left end part of any one of the pair of brackets, and each of the right arc-shaped locks 18 is arranged at an upper surface of the right end part of any one of the pair of brackets, and the left arc-shaped lock 17 and the right arc-shaped lock 18 are configured to fit each other to form an interlock structure.

The screen connecting portions are screen connecting locks 19 arranged in a pair at a front side and a rear side of the bottom support 1. A middle portion of a front end face of the front bracket 11 is provided with the screen connecting lock 19, and a middle portion of a rear end face of the rear bracket 12 is provided with the screen connecting lock 19. Each screen connecting lock 19 comprises two rotational lock bodies 192 spacedly arranged and a lock accommodation groove 191 configured to accommodate the rotational lock bodies 192. The rotational lock body 192 is a screw bolt passing through the bottom support 1. An upper part of each rotational lock body 192 is provided with a rotary valve configured to rotate in a clockwise direction or a counter-clockwise direction for fastening or loosening. A lower part of the rotational lock body 192 is in connection with an external LED display screen in a manner of threaded connection.

The rotational stand 2 comprises:

a connecting axle 21;

a pair of connecting sleeves, comprising: a front connection sleeve 22 sleeving outside one end of the connecting axle 21, and a rear connection sleeve 23 sleeving outside the other end of the connecting axle 21; in which, the front connection sleeve 22 and the rear connection sleeve 23 are provided with mutually matching inner and outer threads, respectively; and one or more rotational crossbeams 24, with one end of each rotational crossbeam 24 sleeving outside an outer periphery of the connecting axle 21 and the other end of the rotational crossbeam 24 provided with a semi-movable buckle 25.

The rear connection sleeve 23 is in a stepped sleeve structure, and an outer periphery of a stepped end is provided with outer threads and configured as an outer threaded part. An inner periphery of the front connection sleeve 22 is provided with inner threads configured to fit the outer threads. An outer periphery of the front connection sleeve 22 is provided with a serrated structure configured for increasing a friction force.

The buckle 25 is a semi-opening locking ring, comprising a pair of semi-circular pieces in hinge joint, the two semi-circular pieces are connected via a hinge joint, one semi-circular piece is in fixed connection with the rotational crossbeam 24, and the other semi-circular piece is a semi-movable structure, with a movable end provided with a linking screw 26.

The left arc-shaped lock 17 and the right arc-shaped lock 18 fit each other to form a rotary pressing type clasp structure. The left arc-shaped lock 17 comprises:

a press handle 171, with one end fixedly connected at a left end of each of the brackets and the other end being a free end, and configured to rotate after being exerted with an external press and to keep in parallel to the each of the brackets in the absence of the external press; and a U-shaped latch 172, being a door-frame structure with a middle part defining an accommodation cavity, an opening end being in fixed connection with a fixed end of the press handle 171.

The right arc-shaped lock 18 comprises a connection boss, an end face of an inner side of the connection boss defining a neck configured for fitting the U-shaped latch 172. The connection boss and the each of the brackets form a movable connection structure. In practical use, the connection boss is configured to be rotated for a certain angle ranging from −10 degrees and +10 degrees as needed. A side of the connection boss is provided with a specific rotation angle scale, and the specific angle of the rotation to the left or right is adjusted according to the actual use requirements. The LED display screen 3 is better applicable to curved surfaces.

Each component of the support mechanism is made of an aluminum alloy material. The connecting rod 13 and the connecting axle 21 are made from a carbon fiber material. The use of the aluminum alloy material and the carbon fiber material is for the purpose of further reducing the weight of the LED display screen 3 and reducing the work intensity of the transportation installation tools during the installation, transportation, and maintenance, while ensuring the strength.

Figure 21:
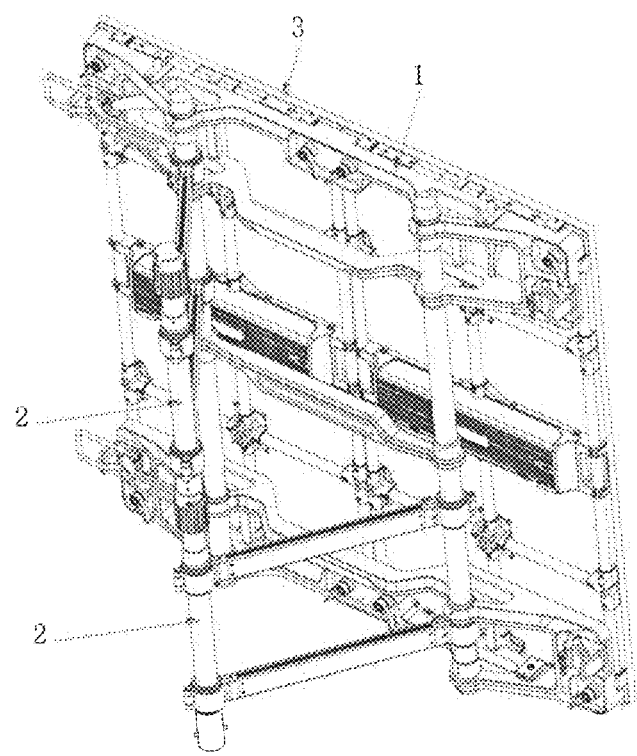
FIG. 21 is a schematic view of an assemblage of the support mechanisms for a display screen of FIG. 10 together with an LED display screen.

As shown in FIGS. 1 and 21, the support mechanism for the display screen is in an unfolded state, in which, the rotational stands 2 use the connecting rods 13 at the right end and the left end of the bottom support 1 as axes to be unfolded to corresponding positions, and are spliced by the lower connecting sleeve and the upper connecting sleeve, such that the two rotational stands 2 of the support mechanism for the LED display screen are fixedly connected to form a stable triangle structure. The unfolded state of the rotational stand 2 increases a thickness in the vertical direction of the support mechanism for the LED display screen, and reaches the requirement of allowing the supported LED display screen 3 to stand on the ground during use, as well as increases the strength of the LED display screen. The thickness of the support mechanism for the LED display screen increases a size in the thickness direction, enhance the capacity in wind resistance. After splicing, the LED display screen 3 is vertically arranged, and in use, the user may climb via the front bracket 11, the spacer bracket 14 and the rear bracket 12 on the support mechanism for the LED display screen, which is in particular prone to maintenance of different positions for large volume LED display screen 3.

In the case of no configuration of the rotational stand 2, that is, when the LED display screen 3 is assembled to the bottom support 1, the user may climb in use through the front bracket 11, the spacer bracket 14, and the rear bracket 12 of the support mechanism for the LED display screen.

As shown in FIG. 1, the assembled support mechanism for the LED display screen according to embodiment 1, in a back view of the bottom support 1, a left upper portion of the bottom support 1 is provided with one rotational stand 2, and a right lower portion of the bottom support 1 is provided with the other rotational stand 2. Each rotational stand has two rotational crossbeams 24.

Figure 10:
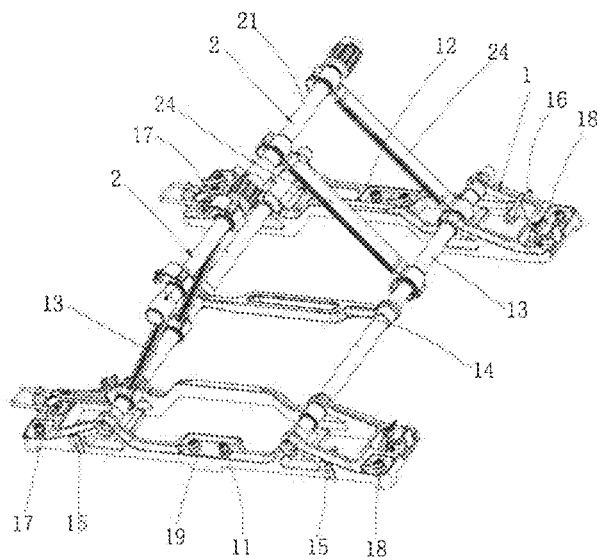
FIG. 10 is a schematic structural view of a support mechanism for a display screen according to another embodiment of the present application in an unfolded state.
Figure 11:
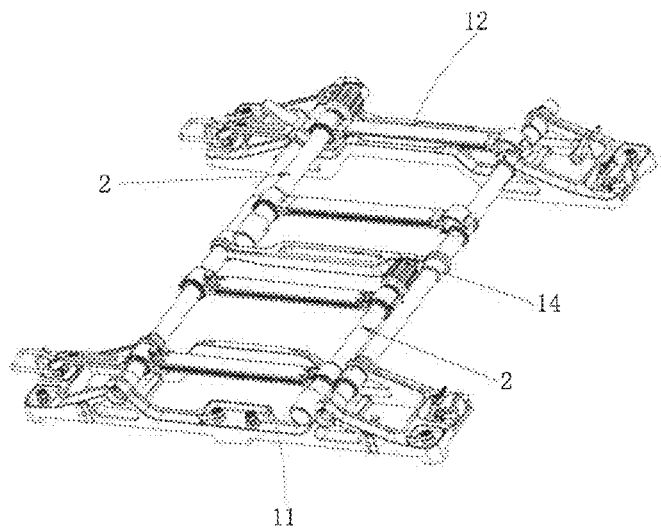
FIG. 11 is a schematic structural view of the support mechanism for a display screen of FIG. 10 in a folded state.
Figure 12:
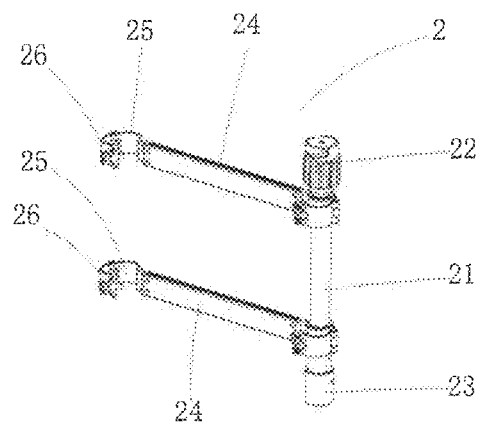
FIG. 12 is a schematic structural view of a rotational stand applied to the support mechanism for a display screen of FIG. 10.
Figure 13:
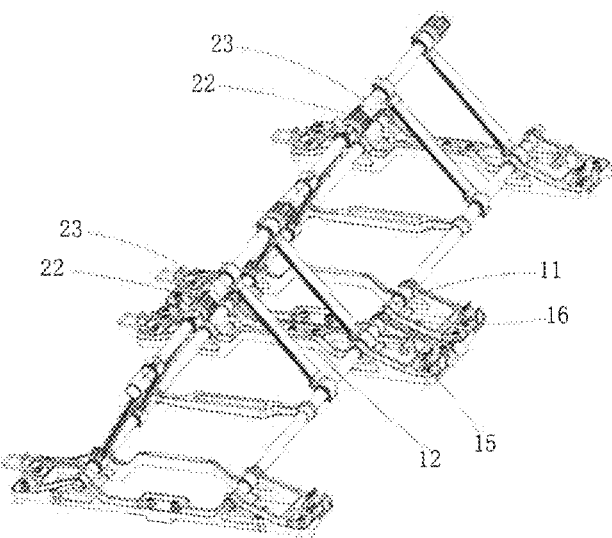
FIG. 13 is a schematic structural view of the support mechanisms for a display screen of FIG. 10 in a state that the support units are longitudinally spliced.
Figure 14:
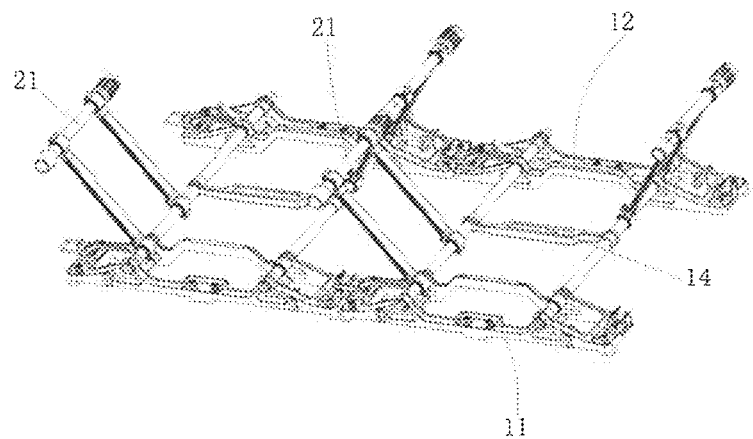
FIG. 14 is a schematic structural view of the support mechanisms for a display screen of FIG. 10 in a state that the support units are transversely spliced.

An assembled support mechanism for the LED display screen according to embodiment 2 is shown in FIGS. 10-14, the structure of which is generally the same as that of embodiment 1 except that: as shown in FIG. 10, in a back view of the bottom support 1, a right upper portion of the bottom support 1 is provided with one rotational stand 2, and a left lower portion of the bottom support 1 is provided with the other rotational stand 2. Such structure also has the same effect as that of embodiment 1 and would not be repeated herein again. Installation of the LED display screen on the support mechanism for the display screen as shown in FIG. 10 is illustrated in FIG. 21.

Figure 15:
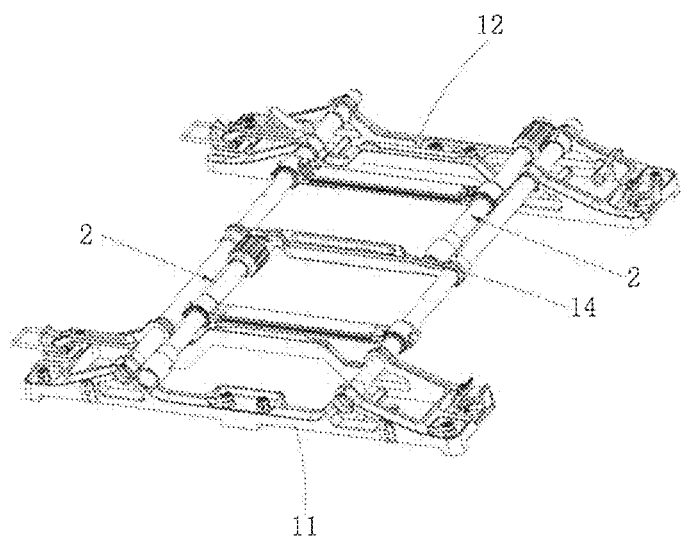
FIG. 15 is a schematic structural view of a support mechanism for a display screen according to another embodiment of the present application in a folded state.
Figure 16:
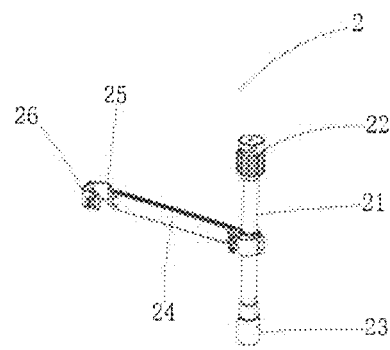
FIG. 16 is a schematic structural view of a rotational stand applied to the support mechanism for a display screen of FIG. 15.
Figure 17:
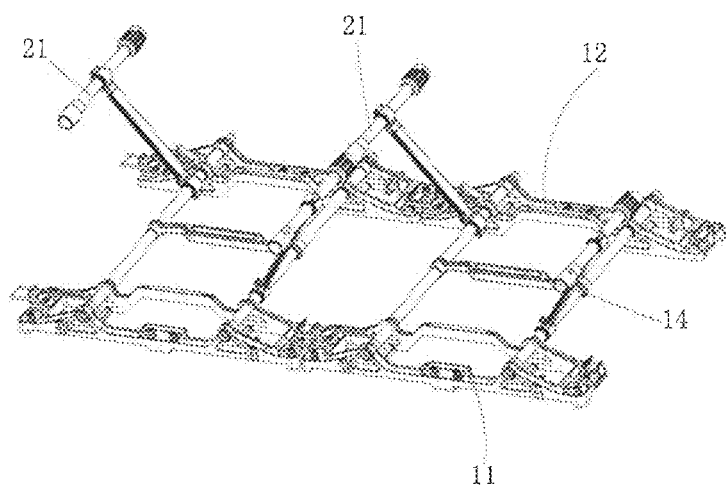
FIG. 17 is a schematic structural view of the support mechanisms for a display screen of FIG. 15 in a state that the support units are transversely spliced.

An assembled support mechanism for the LED display screen according to embodiment 3 is shown in FIGS. 15-17, the structure of which is generally the same as that of embodiment 1 except that: each rotational stand 2 has one rotational crossbeam 24. Such structure also has the same effect as that of embodiment 1 and would not be repeated herein again.

In embodiment 3, in the back view of the bottom support 1, a left upper portion of the bottom support 1 is provided with one rotational stand 2, and a right lower portion of the bottom support 1 is provided with the other rotational stand 2.

Figure 18:
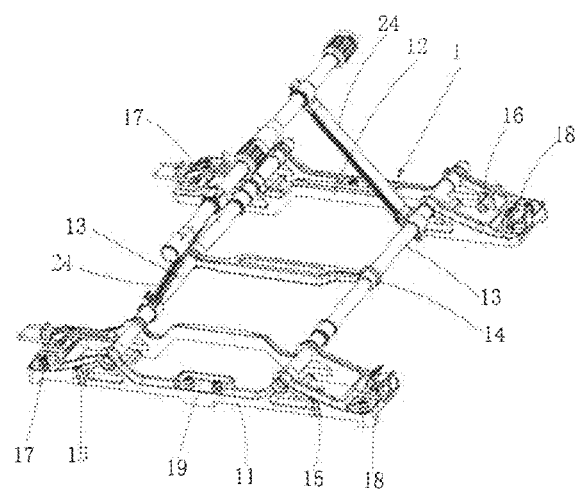
FIG. 18 is a schematic structural view of a support mechanism for a display screen according to another embodiment of the present application in an unfolded state.
Figure 19:
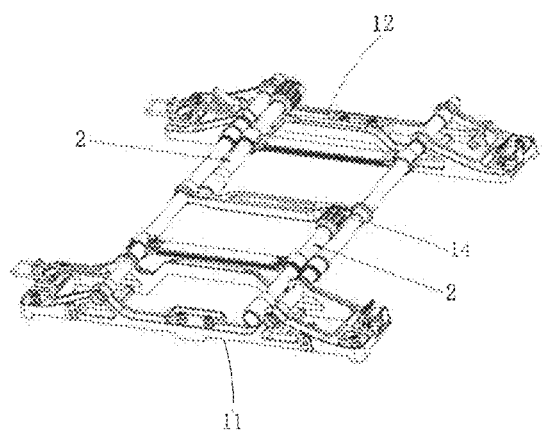
FIG. 19 is a schematic structural view of the support mechanism for a display screen of FIG. 18 in a folded state.
Figure 20:
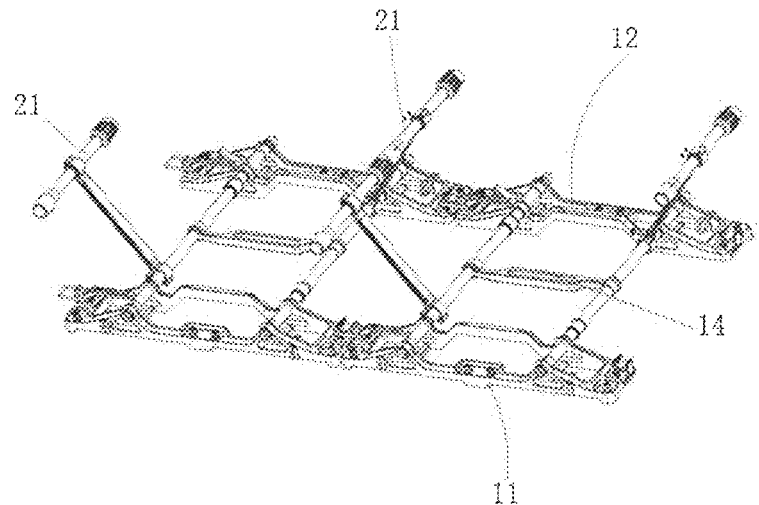
FIG. 20 is a schematic structural view of the support mechanisms for a display screen of FIG. 18 in a state that the support units are transversely spliced.
Figure 22:
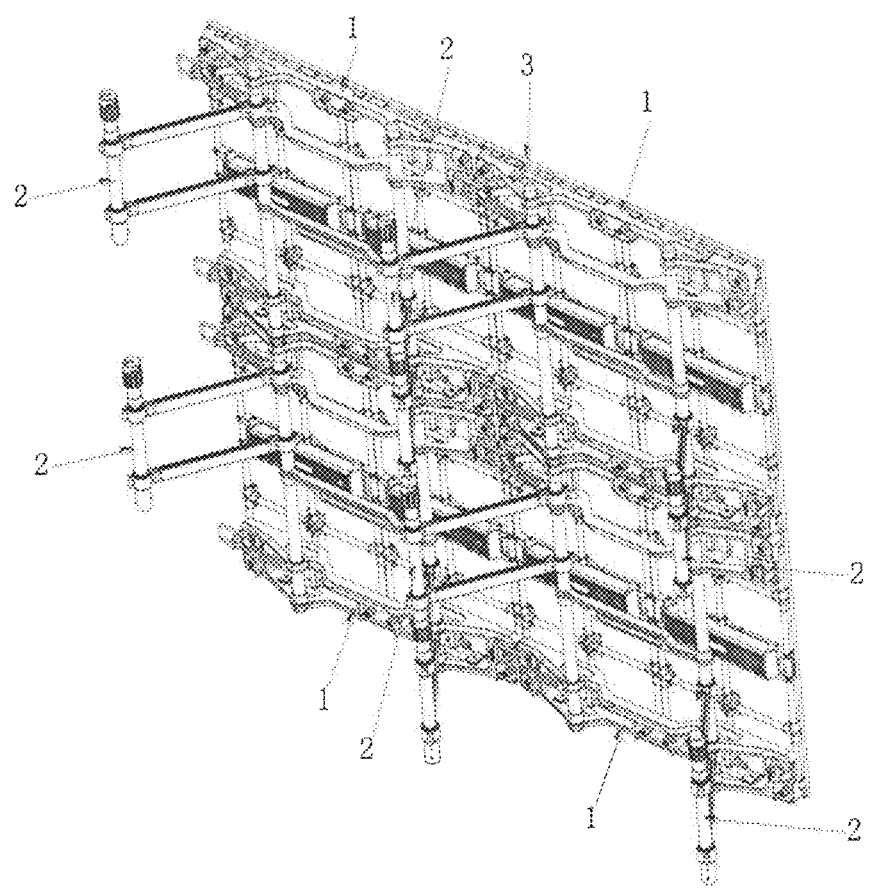
FIG. 22 is a schematic structural view of an assemblage of the support mechanisms for a display screen of FIG. 9 together with an LED display screen.

An assembled support mechanism for the LED display screen according to embodiment 4 is shown in FIGS. 18-20, the structure of which is generally the same as that of embodiment 3 except that: as shown in FIG. 22, form the back view of the bottom support 1, in a back view of the bottom support 1, a right upper portion of the bottom support 1 is provided with one rotational stand 2, and a left lower portion of the bottom support 1 is provided with the other rotational stand 2. Such structure also has the same effect as that of embodiment 1 and would not be repeated herein again.

In other embodiments, the number of the rotational crossbeam 24 of each rotational stand 2 may be plural, and the specific number thereof is not limited herein. Further, in a back view of the bottom support 1, a right upper portion of the bottom support 1 is provided with one rotational stand 2, and a left lower portion of the bottom support 1 is provided with the other rotational stand 2; or alternatively, in the back view of the bottom support 1, a left upper portion of the bottom support 1 is provided with one rotational stand 2, and a right lower portion of the bottom support 1 is provided with the other rotational stand 2. The two options are chosen as needed.

As shown in FIGS. 7-9 and 22, a method for splicing the assembled support mechanism for an LED display screen, comprises the following steps:

S1: assembling the support mechanisms individually as support units;

S2: selecting a plurality of the support units as needed and splicing the plurality of the support units in a longitudinal direction;

placing the bottom supports 1 of the support units at adjacent positions in the longitudinal direction within the same horizontal plane, and connecting the bottom supports 1 via locking pieces 15 and locking columns 16 at adjacent ends in the longitudinal direction.

Repeating steps S2, such that the support mechanism for the display screen can be unlimitedly and accumulatively spliced in the longitudinal direction as needed.

S3: selecting a plurality of the support units as needed and splicing the plurality of the support units in a transverse direction;

placing the bottom supports 1 of the support units at adjacent positions in the transverse direction within the same horizontal plane, and connecting the bottom supports 1 via the left arc-shaped locks 17 and the right arc-shaped locks 18 at adjacent ends in the transverse direction.

Repeating steps S3, such that the support mechanism for the display screen can be unlimitedly and accumulatively spliced in the transverse direction as needed.

In which, step S1 specifically comprises the following steps:

S11: installing a front rotational stand 2;

collecting any one of the rotational stands 2, sleeving a buckle 25 of a rotational crossbeam 24 thereof at a front portion of an outer periphery of any one of the connecting rods 13 of the bottom support 1, fixing the buckle 25 of the rotational crossbeam 24 at the outer periphery of the corresponding connecting rod 13 via the linking screw 26 and limiting degrees of freedom of the rotational crossbeam 24 in three directions, thereby enabling the rotational crossbeam 24 to move in the longitudinal direction with a limited distance and to be rotatable around the connecting rod 13 in connection therewith;

S12: installing a rear rotational stand 2;

collecting another rotational stand 2, sleeving a buckle 25 of a rotational crossbeam 24 thereof at a rear portion of an outer periphery of another connecting rod 13 of the bottom support 1, fixing the buckle 25 of the rotational crossbeam 24 at the outer periphery of the corresponding connecting rod 13 via the linking screw 26 and limiting degrees of freedom of the rotational crossbeam 24 in three directions, thereby enabling the rotational crossbeam 24 to move in the longitudinal direction with a limited distance and to be rotatable around the connecting rod 13 in connection therewith;

S13: splicing the rotational stands 2;

rotating the connecting axles 21 of the front rotational stand 2 and the rear rotational stand 2 after being assembled with the bottom support 1 to the same height level, connecting the front connection sleeve 22 and the rear connection sleeve 23 at two adjacent ends of the connecting axles 21 by threaded connection to form an assembled triangle structure in an unfolded state.

S14: folding the rotational stand 2;

rotating connection sleeves at the adjacent ends of the connecting axles 21 of the assembled rotational stands 2 for disassembling, rotating the front rotational stand 2 and the rear rotational stand 2 after being disassembled respectively to the left direction and the right direction until the front rotational stand 2 and the rear rotational stand 2 are folded onto the bottom support 1.

The rotational stand 2 may be rotated inwards, so as to be fixed inside the support mechanism to form an internal stable triangle. The rotational stand 2 may also be rotated outwards, so as to be fixed with the rotational stands 2 within support mechanisms in the left and/or in the right to form an external stable triangle. The specific rotating direction can be freely chosen by the user according to actual working condition.

The display bracket structure after the installation and the LED display screen 3 connected thereto are placed vertically on a fixed plane at the same time. In this way, the support mechanism for the display screen increases the thickness of the LED display screen as well as the stability and the use intensity of the display screen. The increase in the thickness direction of the support mechanism of the LED display screen will increase the wind resistance torque, thereby enhancing the wind resistance in the outdoor use. Because the LED display screen 3 is large in size, during local maintenance, the operator can climb along the steps formed by the assembled front brackets 11, rear brackets 12, and spacer brackets 14, which is convenient and efficient for the local maintenance.

When the support mechanism for the display screen needs to be folded and stored, it is only required to operate in an reverse order of the above steps for performing the disassembling and storage. Thus, the installation of the support mechanism is flexible and the disassembling thereof is convenient.

In summary, the assembled support mechanism for the LED display screen and the splicing method thereof are capable of realizing fast splicing by a single person. The support mechanism can be folded or unfolded in required working environment, and the unfolded structure enhances the intensity and thickness of the LED display screen, which allows the LED display screen to stand on the ground, and the support mechanism may be climbed in order to maintain the display screen. Based on the unitized splicing operation, the bottom supports can be accumulatively spliced in both the longitudinal direction and the transverse direction, thus having high degree of freedom and flexibility, being suitable to the LED display screens of different specifications and sizes. Based on the technical feature that the LED display screen may be quickly connected with the support mechanism as a whole structure via the screen connecting locks, the conventional steel structure arranged at the back of the LED display screen may be replaced. Moreover, the support mechanism is made of a material comprising high carbon fibers and an aluminum alloy, which greatly reduces the weight of the LED display screen in the installation and operation and the operation complexity thereof. The support mechanism has complete function, simplified and reliable structure, convenient disassembling, and easy transportation.

The above embodiments are only for the purpose of further describing technical contents of the present application for facilitating the understanding of the present application, but are not intended to limit the present application to the above embodiments. Any technical extension or re-creation made according to the present application is protected by the present application. The scope of the present application is defined by the claims.

What is claimed is:

1. An assembled support mechanism for an LED display screen, comprising:
   a bottom support, being in an assembled frame structure, provided with devices configured for longitudinal and transverse splicing at a periphery thereof, and the devices configured for longitudinal and transverse splicing comprising a longitudinal engagement device and a transverse engagement device; and middle portions of a front side and a rear side of the bottom support being respectively provided with screen connecting portions configured for connecting to an LED display screen in a vertical direction; the bottom support comprising:
      a pair of brackets, spacedly arranged in a longitudinal direction and comprising a front bracket and a rear bracket, with the front bracket and the rear bracket being in equivalent structures in mirror symmetry;
      a pair of connecting rods, spacedly arranged in a transverse direction, and configured to connect the front bracket with the rear bracket; and
      a spacer bracket, with two ends thereof respectively connected to the pair of the connecting rods and separating the bottom support into a front part and a rear part; and
   a plurality of rotational stands, in detachable connection with the bottom support, and each rotational stand of the plurality of rotational stands after assembly being rotatable around the bottom support with a rotational angle range of 0° to 180°; wherein
   the longitudinal engagement device comprises locking pieces and locking columns; the locking pieces are arranged in a pair at an inner side of a front end face of the front bracket, and each of the locking pieces defines a connecting through hole in a middle portion thereof; the locking columns are arranged in a pair at an inner side of a rear end face of the rear bracket and pass through the rear end face of the rear bracket; and
   the transverse engagement device comprises left arc-shaped locks and right arc-shaped locks; each of the left arc-shaped locks is arranged at an upper surface of a left end part of any one of the pair of brackets, and each of the right arc-shaped locks is arranged at an upper surface of a right end part of any one of the pair of brackets, and the left arc-shaped locks and the right arc-shaped locks are configured to fit each other to form an interlock structure.

2. The assembled support mechanism for an LED display screen according to claim 1, wherein
   the screen connecting portions are screen connecting locks arranged in a pair at a front side and a rear side of the bottom support; each screen connecting lock comprises two rotational lock bodies spacedly arranged and a lock accommodation groove configured to accommodate the rotational lock bodies; the rotational lock body is a screw bolt passing through the bottom support; an upper part of each rotational lock body is provided with a rotary valve configured to rotate in a clockwise direction or a counterclockwise direction for fastening or loosening; a lower part of the rotational lock body is in connection with an external LED display screen in a manner of threaded connection.

3. The assembled support mechanism for an LED display screen according to claim 1, wherein each of the plurality of rotational stands comprises:
   a connecting axle;
   a pair of connecting sleeves, comprising: a front connection sleeve sleeving outside one end of the connecting axle, and a rear connection sleeve sleeving outside an other end of the connecting axle; wherein the front connection sleeve and the rear connection sleeve are provided with mutually matching inner and outer threads, respectively; and
   one or more rotational crossbeams, with one end of each the one or more rotational crossbeams sleeving outside an outer periphery of the connecting axle and an other end of the one or more rotational crossbeams provided with a semi-movable buckle.

4. The assembled support mechanism for an LED display screen according to claim 3, wherein
   the rear connection sleeve is in a stepped sleeve structure, and an outer periphery of a stepped end is provided with outer threads and configured as an outer threaded part;
   an inner periphery of the front connection sleeve is provided with inner threads configured to fit the outer threads; and an outer periphery of the front connection sleeve is provided with a serrated structure configured for increasing a friction force.

5. The assembled support mechanism for an LED display screen according to claim 3, wherein
   the buckle is a semi-opening locking ring, comprising a pair of semi-circular pieces in hinge joint, wherein the pair of semi-circular pieces are connected via a hinge joint, one semi-circular piece of the pair of semi-circular pieces is in fixed connection with the rotational crossbeam, and the other one of the pair of semi-circular pieces is a semi-movable structure, with a movable end provided with a linking screw.

6. The assembled support mechanism for an LED display screen according to claim 1, wherein
   the left arc-shaped locks and the right arc-shaped locks fit each other to form a rotary pressing type clasp structure;
   the left arc-shaped lock comprises:
   a press handle, with one end fixedly connected at a left end of each of the pair of brackets and an other end of the press handle being a free end, and configured to rotate after being exerted with an external press and to keep in parallel to the each of the pair of brackets in the absence of the external press; and
   a U-shaped latch, having an opening end being in fixed connection with a fixed end of the press handle;
   the right arc-shaped locks each comprise a connection boss, an end face of a left side of the connection boss defining a neck configured for fitting the U-shaped latch; the connection boss and the each of the pair of brackets form a movable connection structure; and
   the connection boss is configured to be rotated for a certain angle ranging from −10 degrees and +10 degrees as needed.

7. The assembled support mechanism for an LED display screen according to claim 1, wherein the pair of connecting rods are made from carbon fibers.

8. The assembled support mechanism for an LED display screen according to claim 1, wherein
in a back view of the bottom support, a left upper portion of the bottom support is provided with one of the plurality of rotational stands, and a right lower portion of the bottom support is provided with another one of the plurality of rotational stands;
or alternatively, in a back view of the bottom support, a right upper portion of the bottom support is provided with one of the plurality of rotational stands, and a left lower portion of the bottom support is provided with another one of the plurality of rotational stands.

9. A method for splicing assembled support mechanisms for an LED display screen, the method being applicable to the assembled support mechanism for an LED display screen according to claim 1, the method comprising the following steps:
S1: assembling the support mechanisms individually as support units;
S2: selecting a plurality of the support units as needed and splicing the plurality of the support units in a longitudinal direction;
placing the bottom supports of the support units at adjacent positions in the longitudinal direction within the same horizontal plane, and connecting the bottom supports via locking pieces and locking columns at adjacent ends in the longitudinal direction; and
S3: selecting a plurality of the support units as needed and splicing the plurality of the support units in a transverse direction;
placing the bottom supports of the support units at adjacent positions in the transverse direction within the same horizontal plane, and connecting the bottom supports via left arc-shaped locks and right arc-shaped locks at adjacent ends in the transverse direction.

10. The method for splicing assembled support mechanisms for an LED display screen according to claim 9, wherein step S1 comprises the following steps:

S11: installing a front rotational stand;
collecting any one of the plurality of rotational stands, sleeving a buckle of a rotational crossbeam thereof at a front portion of an outer periphery of any one of the pair of connecting rods of the bottom support, fixing the buckle of the rotational crossbeam at the outer periphery of the any one of the pair of connecting rods via a linking screw and limiting degrees of freedom of the rotational crossbeam in three directions, thereby enabling the rotational crossbeam to move in the longitudinal direction with a limited distance and to be rotatable around the any one of the pair of connecting rods in connection therewith;
S12: installing a rear rotational stand;
collecting another one of the plurality rotational stands sleeving a buckle of a rotational crossbeam thereof at a rear portion of an outer periphery of another one of the pair of connecting rods of the bottom support, fixing the buckle of the rotational crossbeam at the outer periphery of the another one of the pair of connecting rods via a linking screw and limiting degrees of freedom of the rotational crossbeam in three directions, thereby enabling the rotational crossbeam to move in the longitudinal direction with a limited distance and to be rotatable around the another one of the pair of connecting rods;
S13: splicing the any one of the plurality of rotational stands and the another one of the plurality of rotational stands; and
rotating a connecting axle of the front rotational stand and a connecting axle of the rear rotational stand after being assembled with the bottom support to the same height level, connecting a front connection sleeve and a rear connection sleeve at two adjacent ends of the connecting axle of the front rotational stand and the connecting axle of the rear rotational stand by a threaded connection to form an assembled triangle structure in an unfolded state.

* * * * *